United States Patent [19]
Woods et al.

[11] Patent Number: 4,811,266
[45] Date of Patent: Mar. 7, 1989

[54] MULTIFUNCTION ARITHMETIC INDICATOR

[75] Inventors: William E. Woods, Natick; Richard A. Lemay, Carlisle, both of Mass.

[73] Assignees: Honeywell Bull Inc., Minneapolis, Minn.; Hutton/PRC Technology Partners 1, New York, N.Y.

[21] Appl. No.: 927,630

[22] Filed: Nov. 5, 1986

[51] Int. Cl.$^4$ ............................................. G06F 11/30
[52] U.S. Cl. .................................................. 364/736.5
[58] Field of Search ... 364/736, 737, 749, 200 MS File, 364/900 MS File, 748

[56] References Cited

U.S. PATENT DOCUMENTS

| | | | |
|---|---|---|---|
| 4,393,468 | 7/1983 | New | 364/749 |
| 4,586,130 | 4/1986 | Butts, Jr. et al. | 364/200 |
| 4,649,477 | 3/1987 | MacGregor et al. | 364/200 |

Primary Examiner—Gary V. Harkcom
Assistant Examiner—Long Thanh Nguyen
Attorney, Agent, or Firm—George Grayson; John Solakian; Lewis Elbinger

[57] ABSTRACT

A multifunction arithmetic indicator that is associated with and controlled by an arithmetic logic unit (ALU) to store standard arithmetic indicator information such as overflow, carry, arithmetic sign and all bits equal zero that are generated by the ALU when processing binary information. A control unit sends control signals to multiplexers in the multifunction arithmetic indicator that cause the selection of appropriate arithmetic indicator information from the ALU, no matter what the bit length of binary words being processed by the ALU. The selected indicator information is stored in a register for later use.

3 Claims, 2 Drawing Sheets 4,811,266

MULTIFUNCTION ARITHMETIC INDICATOR

FIELD OF THE INVENTION

This invention relates to arithmetic logic units that can process binary words of different bit sizes.

BACKGROUND OF THE INVENTION

In the prior art, arithmetic logic units (ALUs) typically operate with binary word sizes of a given bit length; such as eight, sixteen or thirty-two bits. Adjunct to the ALUs are circuits that store indicator information such as overflow, carry, arithmetic sign and all bits equal zero that are generated by the ALU while processing binary information words. An arithmetic sign result of a computation is usually stored in and taken from a particular bit location in the binary words, and a carry from the computation involving addition of two binary numbers is taken from the highest order bit position of the binary numbers being processed.

However, there is a problem in the prior art when shorter bit length binary words are to be processed in a system designed for operation with a longer bit length binary word. For example, a carry indicator bit must be detected from a lower order bit location than when the ALU is operating with binary words of full bit length.

Thus, there is a need in the art for a multifunction arithmetic indicator that can function with an ALU that is designed to handle binary words having more than one bit length. Such an indicator should be able to receive and temporarily store standard arithmetic indicator information such as overflow, carry, arithmetic sign and all zeroes condition of computation result despite variable bit length binary words being processed by the ALU.

SUMMARY OF THE INVENTION

The above and other needs in the prior art are met by the subject invention which is a multifunction arithmetic indicator, which functions with and is controlled by an ALU designed to process binary words having different bit lengths. As the ALU processes different bit length binary information it sends control signals to the multifunction arithmetic indicator with which it functions to select and store standard arithmetic indicator information such as overflow, carry, arithmetic sign and all bits equal zero that are generated by the ALU corresponding to the bit length of binary words being processed by the ALU.

DESCRIPTION OF THE DRAWING

The invention will be better understood upon reading the following detailed description in conjunction with the drawing in which.

DETAILED DESCRIPTION

Figure 1:
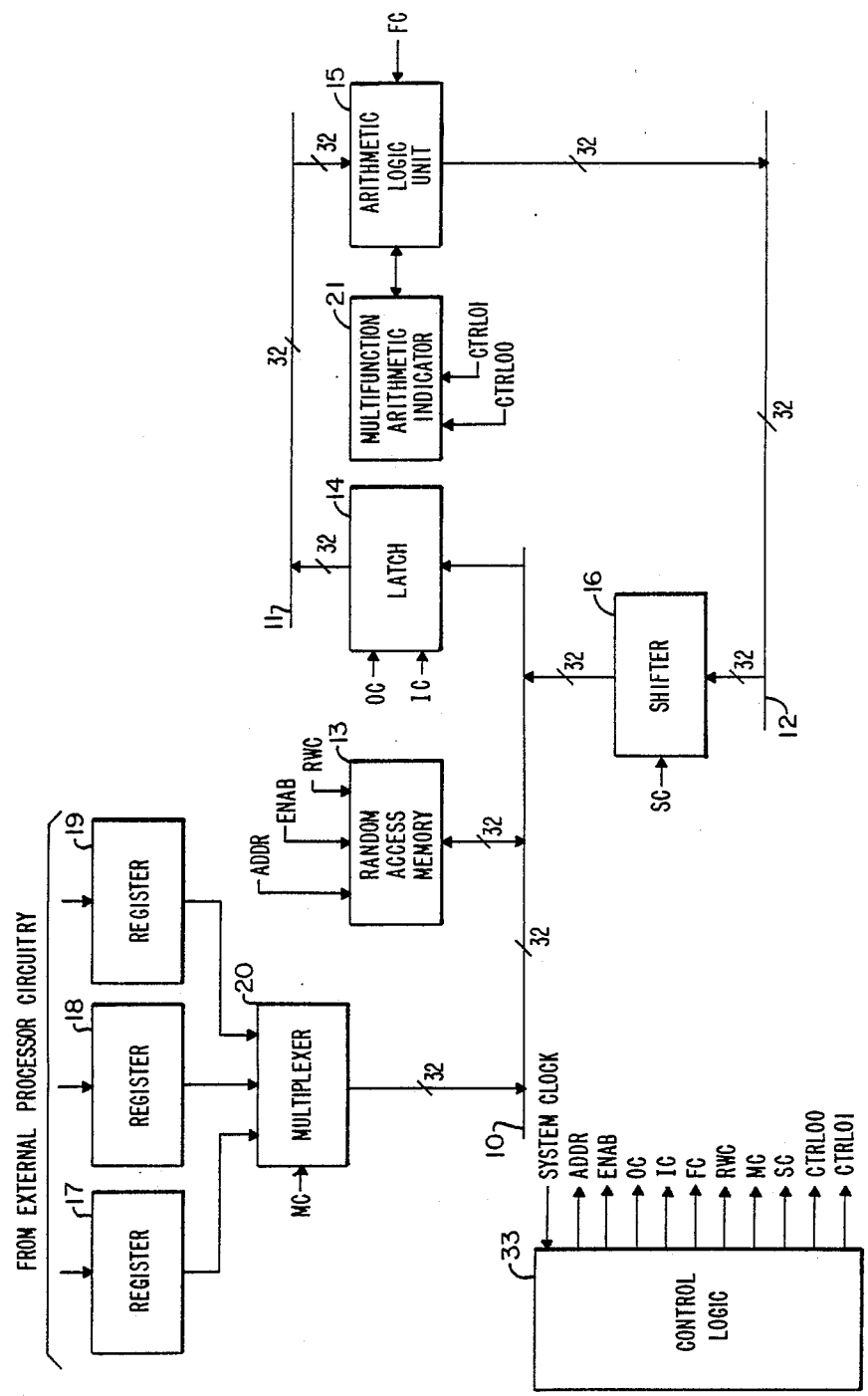
FIG. 1 is a block diagram of a portion of a computer system having an ALU and the novel multifunction arithmetic indicator.

In FIG. 1 is seen a block diagram of a portion of a computer system having an arithmetic logic unit (ALU) with which the multifunction arithmetic indicator functions in accordance with the teaching of the invention. The portion of the computer system shown in FIG. 1 utilizes a time partitioned bus arrangement having three simple busses 10, 11 and 12, each having thirty-two parallel paths to handle thirty-two bit binary words. A number of circuits are connected to or between busses 10, 11 and 12. They are random access memory (RAM) 13, latch 14, arithmetic logic unit (ALU) 15, shifter 16, and multiplexer (MUX) 20. Multiplexer 20 is used to connect individual ones of registers 17, 18 and 19 to bus 10. These circuits are controlled by a control logic circuit 33.

RAM 13 has a number of addressable locations in which are stored addresses or data in a manner well known in the art. The source of information stored in RAM 13 is from external processor circuitry (not shown) and is transferred to the RAM via registers 17, 18 and/or 19, multiplexer 20 and bus 10. RAM 13 has a single thirty-two lead input/output via which thirty-two bit data words are stored in or read out therefrom. The RAM has an addressing control input ADDR to indicate a location therein to be addressed, and also has a control lead ENAB that enables RAM 13 to be used. Furthermore, RAM 13 has a read/write control lead RWC which is used to indicate whether RAM 13 is to be written into or read from.

Latch 14 has a thirty-two bit input connected to bus 10 and a thirty-two bit output connected to bus 11. An input control lead IC controls opening the input of latch 14 to store information present on bus 10. There is also an output control lead OC which controls opening the output of latch 14 to place information stored therein onto bus 11. Latch 14 and its operation are well known in the art.

ALU 15 has a thirty-two bit input connected to bus 11 and a thirty-two bit output connected to bus 12. ALU 15 can perform a variety of arithmetic functions on data input thereto as determined by control signals FC, in a manner well known in the art.

Shifter 16 has a thirty-two bit input connected to bus 12 and a thirty-two bit output connected to bus 10. Shifter 16 is also well known in the art and can be used to perform functions such as transposing bits of binary words passing through the shifter. In the increment example described below shifter 16 acts under control of a signal on its control input SC from control logic circuit 33 to act as a buffer between busses 12 and 10 and passes input thereto directly through without changing them.

Thirty-two bit registers 17, 18 and 19 are well known in the art. They are individually connected to bus 10 via a multiplexer 20 which is under control of control logic circuit 33 via control lead MC to connect ones of the registers to bus 10.

Control logic circuit 33 controls the operations of the above identified circuits in a manner well known in the art but only its control of a few of the circuits is described in detail as are pertinent to understanding the operation of the present invention. This control is accomplished via control signals ADDR, ENAB, RWC, IC, OC, FC, MC and SC which go to the circuits having control leads of the same designation. The leads from control logic circuit 33 are not shown connected to the other circuits to avoid cluttering up the drawing.

The novel multifunction arithmetic indicator 21 receives indicator information such as overflow, carry, arithmetic sign and all-bits-equal-zero that are obtained from within the ALU for binary word lengths of eight, sixteen, twenty-four, and thirty-two bits, although the ALU is designed for thirty-two bit word length operation. All this indicator information is output from the ALU and applied to inputs of indicator 21, but only the indicator information pertinent to the bit length of the binary words being processed in the ALU is selected and stored. To accomplish this selection the multifunction arithmetic indicator 21 is responsive to signals CTRL00 and CTRL01 from control logic 33 indicating the bit length of words being processed by the ALU. The particular indicator information selected and stored in indicator 21 is read out at a later time as required by the system.

Figure 2:
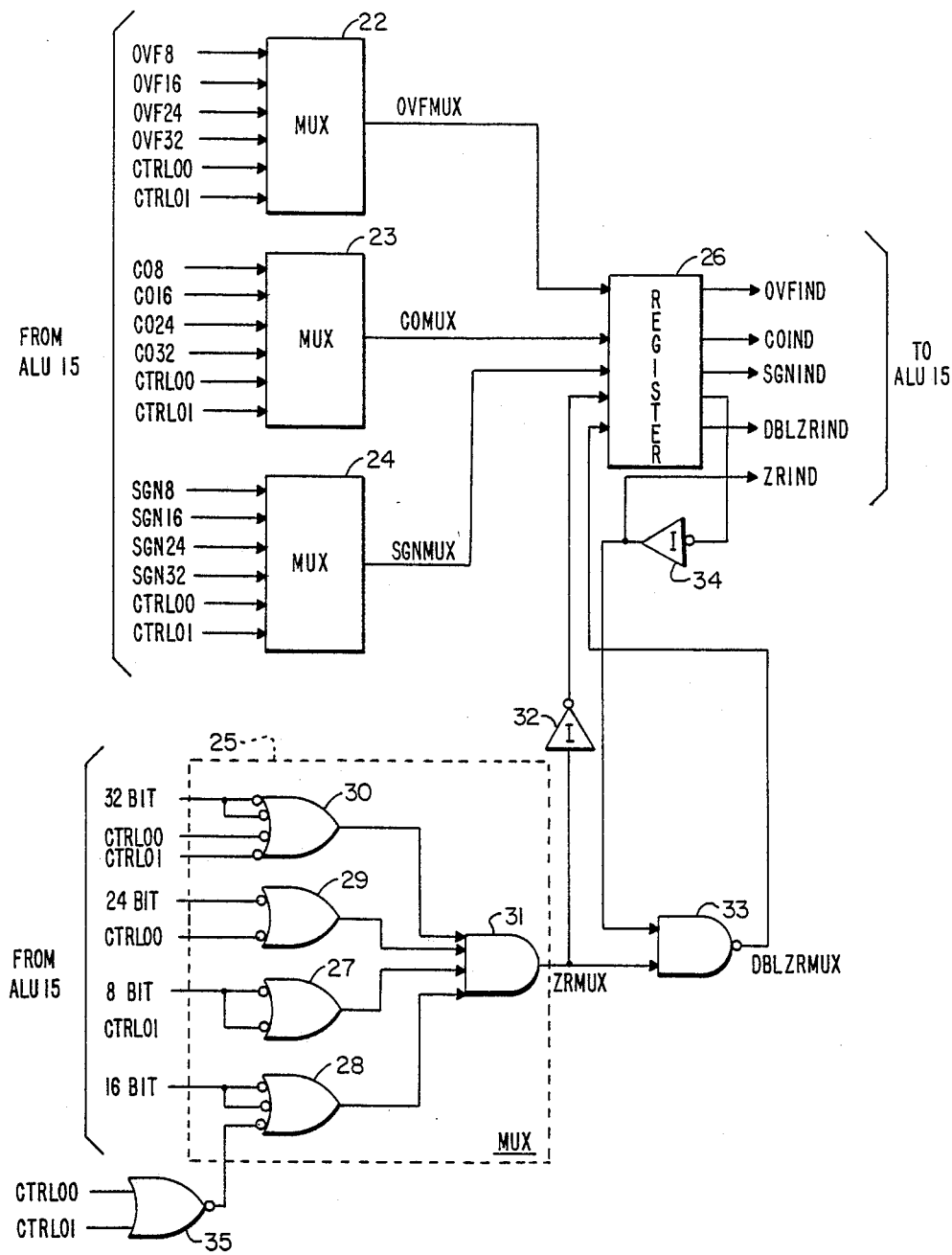
FIG. 2 is a schematic block diagram of the novel multifunction arithmetic indicator.

In FIG. 2 is shown a detailed schematic block diagram of the preferred embodiment of the multifunction arithmetic indicator. The indicator comprises three 4:1 multiplexers 22, 23, 24 (MUXs), and a fourth multiplexer 25 made up from a number of logic gates. Each of the multiplexers receives arithmetic indicator information from the ALU for eight, sixteen, twenty-four and thirty-two bit length words. Multiplexers 22, 23 and 24 are controlled by control signals CTRL00 and CTRL01 from control logic 33 to select and store the indicator information for the bit word length being processed by the ALU. The control signals being two bits have four states (as shown in Table 2) which indicate one of the four sets of indicator data at a time. Two commercial 74S153 dual multiplexers are utilized to implement the three 4:1 multiplexers 22, 23, 24. A first of these dual commercial multiplexers is used to implement MUXs 22 and 23, and half of the second commercial multiplexer is used to implement MUX 24. A commercial 74S64 integrated circuit chip having a number of logic gates therein is utilized to implement MUX 25 by interconnecting and controlling the gates. A commercial 74S174 register having six storage locations is utilized as register 26 to store a selected set of indicator information received from ALU 15 via MUXs 22 through 25. Miscellaneous standard logic gates and inverters are also utilized. Table 1 immediately hereafter tabulates the connections to the MUXs and the register.

TABLE 1

| Dual Multiplexer - 74S153 | | |
|---|---|---|
| CTRL0 | input pin 2 | MUX control leads |
| CTRL1 | input pin 14 | |
| MUX 22 | | |
| OVF8 | input pin 3 | MUX overflow inputs |
| OVF16 | input pin 4 | |
| OVF24 | input pin 5 | |
| OVF32 | input pin 6 | |
| OVFMUX | output pin 7 | MUX overflow output |
| MUX 23 | | |
| CO8 | input pin 13 | MUX carry out inputs |
| CO16 | input pin 12 | |
| CO24 | input pin 11 | |
| CO32 | input pin 10 | |
| COMUX | output pin 9 | MUX carry out output |
| Dual Multiplexer - 74S153 | | |
| CTRL0 | input pin 2 | MUX control leads |
| CTRL1 | input pin 14 | |
| MUX 24 | | |
| SGN8 | input pin 3 | MUX sign inputs |
| SGN16 | input pin 4 | |
| SGN24 | input pin 5 | |
| SGN32 | input pin 6 | |
| SGNMUX | output pin 7 | MUX sign output |
| Logic Gate Array - 74S64 - Multiplexer 25 | | |
| CTRL0 | input pins 3 & 12 | MUX control lead |
| CTRL1 | input pin 13 | MUX control lead |
| 8BIT | input pins 9 & 10 | 1st 8 bit zero indicator |
| 16BIT | input pins 4 & 5 | 2nd 8 bit zero indicator |
| 24BIT | input pin 2 | 3rd 8 bit zero indicator |
| 32BIT | input pins 1 & 11 | 4th 8 bit zero indicator |
| ZRMUX | output pin 8 | operand zero indication |

TABLE 1-continued

| Register 26 - 74S174 | |
|---|---|
| input pin 3 | OVFMUX input |
| input pin 4 | COMUX input |
| input pin 6 | SGNMUX input |
| input pin 11 | ZRMUX input |
| input pin 13 | DBLZR input |
| output pin 2 | OVFIND output |
| output pin 5 | COIND output |
| output pin 7 | SGNIND output |
| output pin 10 | ZRIND output |
| output pin 12 | DBLZRIND output |

MUX 22 has four overflow inputs OVF8, OVF16, OVF24 and OVF32 received from ALU 15 that indicate the arithmetic overflow condition respectively for eight, sixteen, twenty-four and thirty-two bit word lengths being processed in ALU 15. The commercial dual multiplexer from which MUXs 22 and 23 are implemented has two control inputs to which control signals CTRL00 and CTRL01 are applied as described previously. One of these four overflow inputs is selected at a time and the selected overflow signal is connected to the output OVFMUX of MUX 22, and from thence it is input to and stored in a first of the multiple storage locations in register 26. The overflow indication stored in the first storage location in register 26 is present on the output of that storage location as overflow indication signal OVFIND. This signal is used by the system in a manner known in the art for subsequent processing.

MUX 23 has four carry-out bit inputs CO8, CO16, CO24 AND CO32 received from ALU 15 respectively for eight, sixteen, twenty-four and thirty-two bit word lengths being processed in ALU 15. One of these four carry-out inputs is selected at a time by the same selector control signals CTRL00 and CTRL01 applied to the control inputs of the dual multiplexer that MUX 23 shares with MUX 22. The selected carry-out signal COMUX at the output of MUX 23 is input to and stored in a second of the multiple storage locations in register 26. The carry-out signal stored in the second storage location in register 26 is present on the output of that storage location as carry-out indication signal COIND. This signal is used by the system in a manner known in the art for subsequent processing.

MUX 24 has four arithmetic sign inputs SGN8, SGN16, SGN24 and SGN32 received from ALU 15 respectively for eight, sixteen, twenty-four and thirty-two bit word lengths being processed in ALU 15. One of these four arithmetic sign inputs is selected at a time by the CTRL00 and CTRL01 control signals also applied to the control inputs of multiplexer 24. The selected arithmetic sign signal SGNMUX at the output of MUX 24 is input to and stored in a third of the multiple storage locations in register 26. The arithmetic sign signal stored in the third storage location in register 26 is present on the output of that storage location as sign signal SGNIND. This signal is used by the system in a manner known in the ar for subsequent processing.

To accomplish an all zero indication of all bits of eight, sixteen, twenty-four or thirty-two bit words output from ALU 15, four eight-bit logic circuits are used to monitor the maximum of thirty-two bits in four groups of eight bits apiece. These logic circuits are not shown in FIG. 2 and are not part of the invention. However, they are easily implemented by one skilled in the art. If all eight bits input to each of these logic circuits are zero, there is an output from each of them. It is the output from each of these four logic circuits that is input to MUX 25. A first of the four logic circuits monitors bits 24–31 of the maximum thirty-two bits in ALU 15 and generates a signal 8 BIT that is input to the two inputs of OR gate 27 in logic circuit/multiplexer 25. Gate 27 causes the ZRMUX output of AND gate 31 to be sensitive to the state of bits 24–31 for all operand lengths (8, 16, 24 or 32 bits).

TABLE 2

| Operand Length | CTRL00 | CTRL01 | Output of Gate 35 |
|---|---|---|---|
| 8 bits | 0 | 0 | 0 |
| 16 bits | 0 | 1 | 1 |
| 24 bits | 1 | 0 | 1 |
| 32 bits | 1 | 1 | 1 |

A second of the four logic circuits (not shown) monitors bits 16–23 of the maximum thirty-two bits in ALU 15 and generates a signal 16 BIT that is input to two of the three inputs of OR gate 28 in circuit 25. The output of OR gate 35 is true for operand lengths of 16, 24 or 32 bits as indicated in Table 2 above. OR gate 28 therefore causes the ZRMUX output of AND gate 31 to be sensitive to the state of bits 16–23 for operand lengths of 16, 24 or 32 bits.

A third of the four logic circuits (not shown) monitors bits 08–15 of the maximum thirty-two bits in ALU 15 and generates a signal 24 BIT that is input to one of the two inputs of OR gate 29 in circuit 25. Control signal CTRL00 allows OR gate 29 to cause the ZRMUX output of AND gate 31 to be sensitive to the state of bits 08–15 for operand lengths of 24 or 32 bits.

A fourth of the four logic circuits monitors bits 00–07 of the maximum thirty-two bits in ALU 15 and generates a signal 32 BIT that is input to two of the four inputs of OR gate 30 in circuit 25. Control signals CTRL00 and CTRL01 allow OR gate 30 to cause the ZRMUX output of AND gate 31 to be sensitive to the state of bits 00–07 for the operand length of 32 bits only.

The output of gates 27 through 30 are all input to AND gate 31 inside of circuit 25 and there is an output from gate 31 only when all its inputs are high. The result is that for eight bit words being processed in ALU 15 the outputs of gates 28–30 are forced high and only the output of gate 27 determines whether all bits are zero; for sixteen bit words the outputs of gates 29 and 30 are forced high and only the outputs of gates 27 and 28 determine whether all bits are zero; for twenty-four bit words the output of gate 30 is forced high and only the outputs of gates 27 through 29 determine whether all bits are zero; and for thirty-two bit words none of the gates outputs are forced high and all of gates 27 through 30 determine whether all bits are zero.

An all zeroes output signal ZRMUX is output from circuit 25 whenever a word bit length being monitored has all zeroes. This signal is inverted by inverter 32 and is input to and stored in a fourth of the multiple storage locations in register 26. The all zeroes signal stored in the fourth storage location in register 26 is present on the output of that storage location as zero signal ZRIND. This signal is used by the system in a manner known in the art for subsequent processing.

Multifunction arithmetic indicator 21 shown in detail in FIG. 2 also provides an indication if two binary words in a row are all zeroes. The ZRMUX output signal from logic gate array/multiplexer circuit 25 is also input to one of two inputs to an AND gate 33. The second input to this AND gate 33 is zero indication signal ZRIND from a previous binary word the digits of which were previously checked for all zeroes by circuit 25. Thus, if two binary words in a row are all zeroes there is a double zeroes signal DBLZR output from gate 33 which is input to and stored in a fifth of the multiple storage locations in register 26. The double zeroes signal stored in the fifth storage location in register 26 is present on the output of that storage location as double zeroes signal DBLZRIND. This signal is used by the system in a manner known in the art for subsequent processing.

While what has been described herein is the preferred embodiment of the invention, it will be obvious to those skilled in the art that numerous changes may be made thereto without departing from the spirit and scope of the invention. For example, the number of arithmetic indicators that are sensed, selected and stored may be increased.

What is claimed is:

1. A multifunction arithmetic indicator comprising in combination
    an arithmetic logic unit capable of processing operands of n different word lengths and having a parallel condition code output lines for each one of c different status conditions,
    a source of a control signal connected to said arithmetic logic unit for indicating which of said n different operand lengths is to be processed thereby,
    c selection means, each generating an output flag signal for one of said c status conditions, each selection means comprising, in combination,
        an output conductor,
        a control input connected to receive said control signal,
        n condition code inputs connected to the n condition code output lines for the corresponding one of said c status conditions, and
        logic means responsive to said control signal for steering the signal applied to one of said n condition code inputs to said output conductor, and
    a condition code output register connected to the output conductor from each of said c selection means for storing condition code information indicative of the result of processing said operands.

2. The invention in accordance with claim 1 further comprising first circuit means jointly responsive to a portion of the contents of said register and to the output of one of said selection means to indicate sequential occurrences of one of said c status conditions.

3. The combination set forth in claim 1 wherein a largest operand processed by said arithmetic logic unit comprises n fields and wherein said c status conditions as indicated by signals on said condition code output lines from said arithmetic logic unit comprise:
    a carry out bit for each of said n different operand lengths,
    an overflow bit for each of said n different operand lengths,
    a sign bit for each of said n different operand lengths, and
    an all zero bit for each of said n fields.

* * * * *